United States Patent
Shah

(10) Patent No.: US 7,813,306 B2
(45) Date of Patent: Oct. 12, 2010

(54) METHOD AND APPARATUS FOR PROVIDING DOWNLINK DELAY DIVERSITY

(75) Inventor: Dipesh Shah, Fremont, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 1036 days.

(21) Appl. No.: 11/040,250

(22) Filed: Jan. 21, 2005

(65) Prior Publication Data

US 2006/0166701 A1    Jul. 27, 2006

(51) Int. Cl.
*H04B 1/56* (2006.01)

(52) U.S. Cl. .......................... 370/276; 370/280; 370/465; 370/468; 370/329; 370/331; 455/450; 455/423; 455/436; 455/437; 455/329

(58) Field of Classification Search .............. 455/561, 455/450, 423, 436, 437, 439; 370/276, 280, 370/465, 468, 329
See application file for complete search history.

(56) References Cited

U.S. PATENT DOCUMENTS 6,539,227 B1    3/2003    Jetzek et al.
6,731,619 B1 *  5/2004    Ramesh et al. .............. 370/334
2002/0136158 A1    9/2002    Frank
2003/0072293 A1    4/2003    Fischer
2003/0117980 A1    6/2003    Kim et al.
2003/0119452 A1    6/2003    Kim et al.
2003/0124995 A1    7/2003    Tanaka
2006/0056320 A1 *  3/2006    Gatts .......................... 370/276

* cited by examiner

*Primary Examiner*—Ajit Patel
*Assistant Examiner*—Khai M Nguyen
(74) *Attorney, Agent, or Firm*—Moazzam & Associates, LLC

(57) ABSTRACT

A method and apparatus for providing downlink transmit delay diversity (TDD). In accordance with the invention, a BTS includes at least one simplex transceiver (S-TRX) that does not implement downlink TDD and at least one duplex transceiver (D-TRX) that does implement TDD. In accordance with the preferred embodiment, the BTS has "N" S-TRXs and "A" D-TRXs, where N and A are positive integers and A is less than N. When downlink TDD is implemented, a total of N+A transceivers may be used (i.e., N S-TRXs and A D-TRXs). When downlink TDD is not needed, as many as N S-TRXs may be used. When downlink TDD is not needed, typically no D-TRXs are used. Therefore, the present invention reduces the amount of resources that is required to implement downlink TDD. In addition, the present invention efficiently utilizes resources by preferably implementing downlink TDD only when it is needed.

8 Claims, 5 Drawing Sheets

METHOD AND APPARATUS FOR PROVIDING DOWNLINK DELAY DIVERSITY

TECHNICAL FIELD OF THE INVENTION

The invention relates to wireless communications networks, and more particularly, to reducing the amount of resources needed to implement downlink transmit delay diversity.

BACKGROUND OF THE INVENTION

If a mobile device is located in a power pattern null of the base station (BS) transmitter antenna, the mobile device will not receive the signal being transmitted. In order to solve this problem, each call between a mobile device and the base transceiver station (BTS) is handled by two transmitters at the BTS, each of which is connected to a respective antenna. The transmitters transmit the same information, but the transmission by one transmitter is delayed by one quarter of a symbol with respect to the transmission by the other. This delay ensures that if the mobile device is located in the null of the antenna of one of the transmitters handling the call, the mobile device will not also be located in the null of the antenna of the other transmitter handling the call. Such transmit delay diversity improves signal reception in the downlink direction.

BTSs that provide downlink transmit delay diversity (TDD) normally allocate a pair of transmitters to handle each call. For example, if each BTS transmitter has eight time slots for handling eight different calls, then a pair of transmitters should have sixteen time slots for handling sixteen calls. However, in order to provide downlink TDD, each call must be handled by two transmitters. Therefore, each pair of transmitters only has eight time slots and thus can only handle eight different calls. Consequently, twice as many transmitters and antennas are needed to provide downlink TDD than are needed when downlink TDD is not provided.

A need exists for a way to provide TDD in the downlink direction that reduces the overall number of transmitters and antennas that are needed at the BTS.

SUMMARY OF THE INVENTION

The present invention is directed to a method and apparatus for providing downlink transmit delay diversity (TDD). In accordance with the invention, a BTS includes at least one simplex transceiver (S-TRX) that does not implement downlink TDD and at least one duplex transceiver (D-TRX) that does implement TDD.

In accordance with the preferred embodiment of the invention, the BTS has "N" S-TRXs and "A" D-TRXs, where N and A are positive integers and A is less than N. When downlink TDD is implemented, a total of N+A transceivers may be used (i.e., N S-TRXs and A D-TRXs). When downlink TDD is not needed, as many as N S-TRXs may be used. When downlink TDD is not needed, typically no D-TRXs are used. Because the value of A is less than the value of N, the value of N+A will always be less than the value of 2N. As described above, currently 2N transceivers are used at BTSs that implement downlink TDD. Therefore, the present invention reduces the amount of resources that is required to implement downlink TDD.

In addition, the present invention efficiently utilizes resources by preferably implementing downlink TDD only when it is needed. In accordance with one embodiment, during call setup, a determination is made as to whether or not downlink TDD is needed for the call. If so, the call is allocated to a transceiver that implements downlink TDD. If not, the call is allocated to a transceiver that does not implement downlink TDD. In accordance with this embodiment, the apparatus comprises first logic configured to evaluate one or more downlink parameters during call setup, second logic configured to determine whether or not TDD is needed for the call being setup based on the evaluation by the first logic, third logic configured to allocate a duplex transceiver to the call being setup if the second logic makes a determination that downlink TDD is needed, and fourth logic configured to allocate a simplex transceiver to the call being setup if the second logic determines that downlink TDD is not needed for the call being setup. The duplex transceiver is configured to implement downlink TDD. The simplex transceiver is not configured to implement downlink TDD.

In accordance with another embodiment, the invention is directed to an apparatus that performs an intracell handover from a first transceiver to a second transceiver in the same coverage area. The first transceiver is not configured to implement downlink TDD. The second transceiver is configured to implement downlink TDD. If the apparatus determines that downlink TDD is needed, the call is handed over from the first transceiver to the second transceiver. The apparatus comprises first logic configured to evaluate one or more downlink parameters while a call is in progress between a mobile device and the first transceiver, second logic configured to determine whether or not downlink TDD is needed for the call based on the evaluation by the first logic, and third logic configured to initiate a handover from the first transceiver to the second transceiver if the second logic determines that downlink TDD is needed.

In accordance with another embodiment, the invention is directed to an apparatus that performs an intracell handover from a first transceiver to a second transceiver in the same coverage area. The first transceiver is configured to implement downlink TDD. The second transceiver is not configured to implement downlink TDD. If the apparatus determines that downlink TDD is not needed, the call is handed over from the first transceiver to the second transceiver. The apparatus comprises first logic configured to evaluate one or more downlink parameters while a call is in progress between a mobile device and the first transceiver, second logic configured to determine whether or not downlink TDD is needed for the call based on the evaluation by the first logic, and third logic configured to initiate a handover from the first transceiver to the second transceiver if the second logic determines that downlink TDD is no longer needed.

In accordance with another embodiment, the invention is directed to an apparatus for handing over a call from a transceiver of a first base transceiver station (BTS) to a transceiver of a second BTS. The apparatus comprises first logic configured to evaluate one or more downlink parameters associated with a call as the call is being handed over from the first BTS to the second BTS, second logic configured to determine whether or not downlink TDD will be needed for the call when it is handed over to the second BTS based on the evaluation by the first logic, and third logic configured to initiate a handover from the transceiver of the first BTS to the transceiver of the second BTS if the second logic determines that downlink TDD is needed. In accordance with this embodiment, the transceiver of the second BTS is configured to implement downlink TDD.

In accordance with another embodiment, the invention comprises an apparatus for handing over a call from a transceiver of a first base transceiver station (BTS) to a transceiver of a second BTS that is not configured to implement downlink TDD. The apparatus comprises first logic configured to evaluate one or more downlink parameters associated with a call as the call is being handed over from the first BTS to the second BTS, second logic configured to determine whether or not downlink transmit delay diversity (TDD) will be needed for the call when it is handed over to the second BTS based on the evaluation by the first logic, and third logic configured to initiate a handover from the transceiver of the first BTS to the transceiver of the second BTS if the second logic determines that downlink TDD is not needed.

In accordance with another embodiment, the invention is directed to a method for allocating resources during call setup based on whether downlink TDD is needed for the call. The method comprises evaluating one or more downlink parameters during call setup, determining whether or not downlink TDD is needed for the call being setup based on the evaluation, allocating a duplex transceiver to the call being setup if a determination that downlink TDD is needed, and allocating a simplex transceiver to the call being setup if a determination is made that downlink TDD is not needed for the call being setup. The duplex transceiver is configured to implement downlink TDD. The simplex transceiver not configured to implement downlink TDD.

In accordance with another embodiment, the method comprises evaluating one or more downlink parameters while a call is in progress between a mobile device and a first transceiver, determining whether or not downlink TDD is needed for the call based on the evaluation, and initiating a handover from the first transceiver to the second transceiver if a determination is made that downlink TDD is needed. In accordance with this embodiment, the first transceiver is not configured to implement downlink TDD and the second transceiver is configured to implement downlink TDD.

In accordance with another embodiment, the invention provides a method for performing an intracell handover from a first transceiver in a first coverage area of a wireless network to a second transceiver in the same coverage area. The method comprises evaluating one or more downlink parameters while a call is in progress between a mobile device and a first transceiver, determining whether or not downlink TDD is needed for the call based on the evaluation, and initiating a handover from the first transceiver to the second transceiver if a determination is made that downlink TDD is not needed. In accordance with this embodiment, the first transceiver is configured to implement downlink TDD and the second transceiver is not configured to implement downlink TDD.

In accordance with another embodiment, the invention provides a method for handing over a call from a transceiver of a first BTS to a transceiver of a second BTS. The method comprises evaluating one or more downlink parameters associated with a call as the call is being handed over from the first BTS to the second BTS, determining, based on the evaluation, whether or not downlink TDD will be needed for the call when it is handed over to the second BTS, and initiating a handover from the transceiver of the first BTS to the transceiver of the second BTS if a determination is made that downlink TDD is needed. In accordance with this embodiment, the transceiver of the second BTS is configured to implement downlink TDD.

In accordance with another embodiment, the transceiver of the second BTS to which the call is handed over is not configured to implement downlink TDD. This method comprises evaluating one or more downlink parameters associated with a call as the call is being handed over from the first BTS to the second BTS, determining, based on the evaluation, whether or not downlink TDD will be needed for the call when it is handed over to the second BTS, and initiating a handover from the transceiver of the first BTS to the transceiver of the second BTS if a determination is made that downlink TDD is not needed.

The invention also provides a computer program for performing the above-summarized methods.

These and other features and advantages of the invention will become apparent from the following description, drawings and claims.

DETAILED DESCRIPTION OF THE PREFERRED EMBODIMENT

Figure 1:
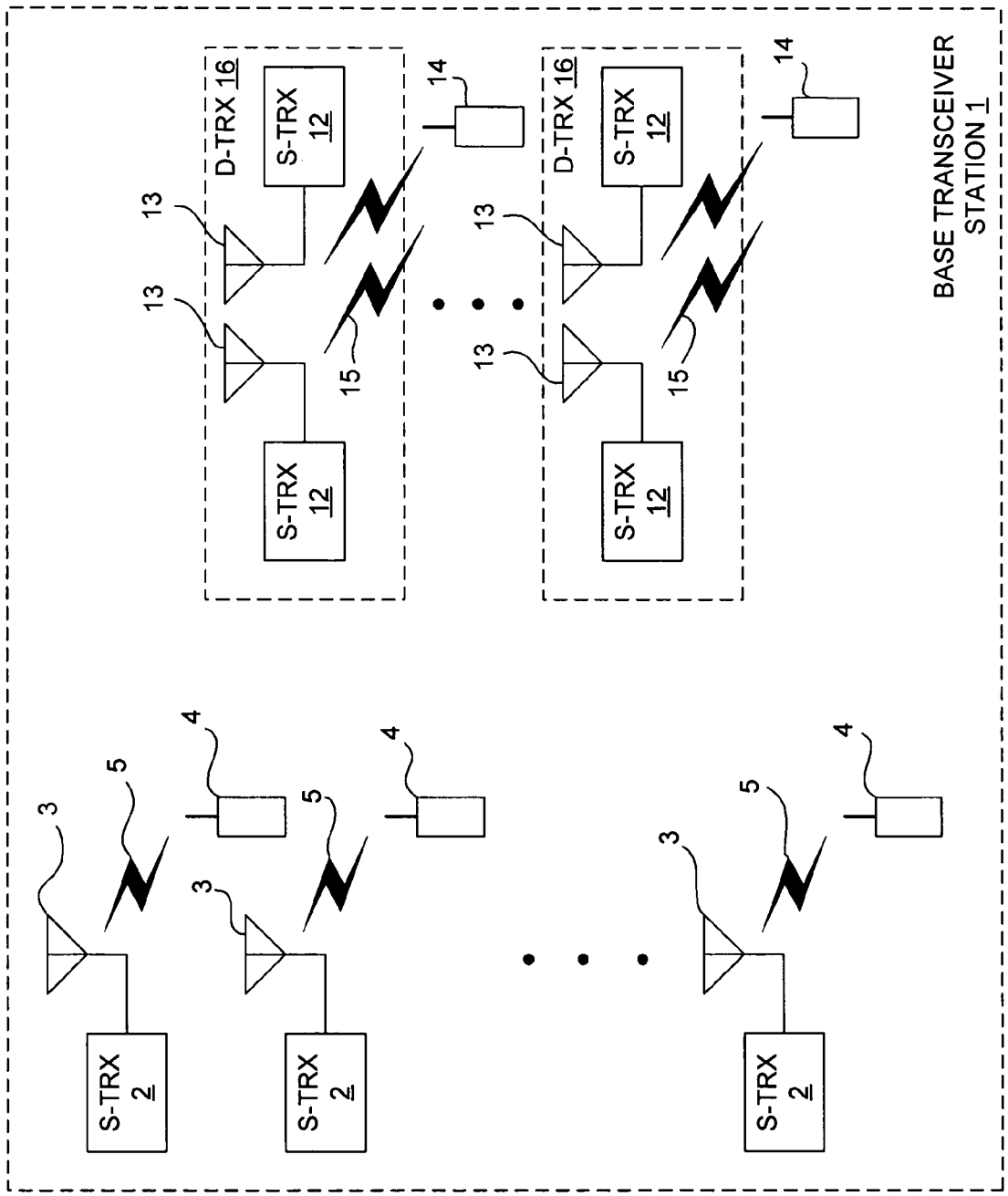
FIG. 1 illustrates a block diagram of the BTS configuration of the invention in accordance with the preferred embodiment, wherein the BTS comprises "N" transceivers that do not implement downlink TDD and "A" transceivers that implement downlink TDD.

In accordance with the invention, a BTS includes at least one simplex transceiver (S-TRX) that does not implement downlink TDD and at least one duplex transceiver (D-TRX) that does implement TDD. This configuration is shown in FIG. 1. In accordance with the preferred embodiment of the invention, the BTS 1 has "N" S-TRXs 2 and "A" D-TRXs 16, where N and A are positive integers and A is less than N. When downlink TDD is implemented, a total of N+A transceivers may be used (i.e., N S-TRXs and A D-TRXs). When downlink TDD is not needed, as many as N S-TRXs 2 may be used. When downlink TDD is not needed, typically no D-TRXs are used.

Each of the S-TRXs 2 is connected to a respective antenna 3. Each S-TRX 2 is capable of handling one respective mobile device 4 during a respective time slot. The S-TRXs 2 communicate with the mobile devices 4 over a wireless communications link 5. Each D-TRX 16 has two S-TRXs 12, each of which is connected to a respective antenna 13. When downlink TDD is implemented, each D-TRX 16 is capable of handling one respective mobile device 14 during a respective time slot. The D-TRXs 16 communicate with the respective mobile devices 14 during the respective time slots over a wireless communications link 15.

Because the value of A is less than the value of N, the value of N+A will always be less than the value of 2N. As described above, currently 2N transceivers are used at BTSs that implement downlink TDD. In accordance with the invention, downlink TDD may be implemented using N+A transceivers. Therefore, the present invention reduces the amount of resources that is required to implement downlink TDD.

Figure 2:
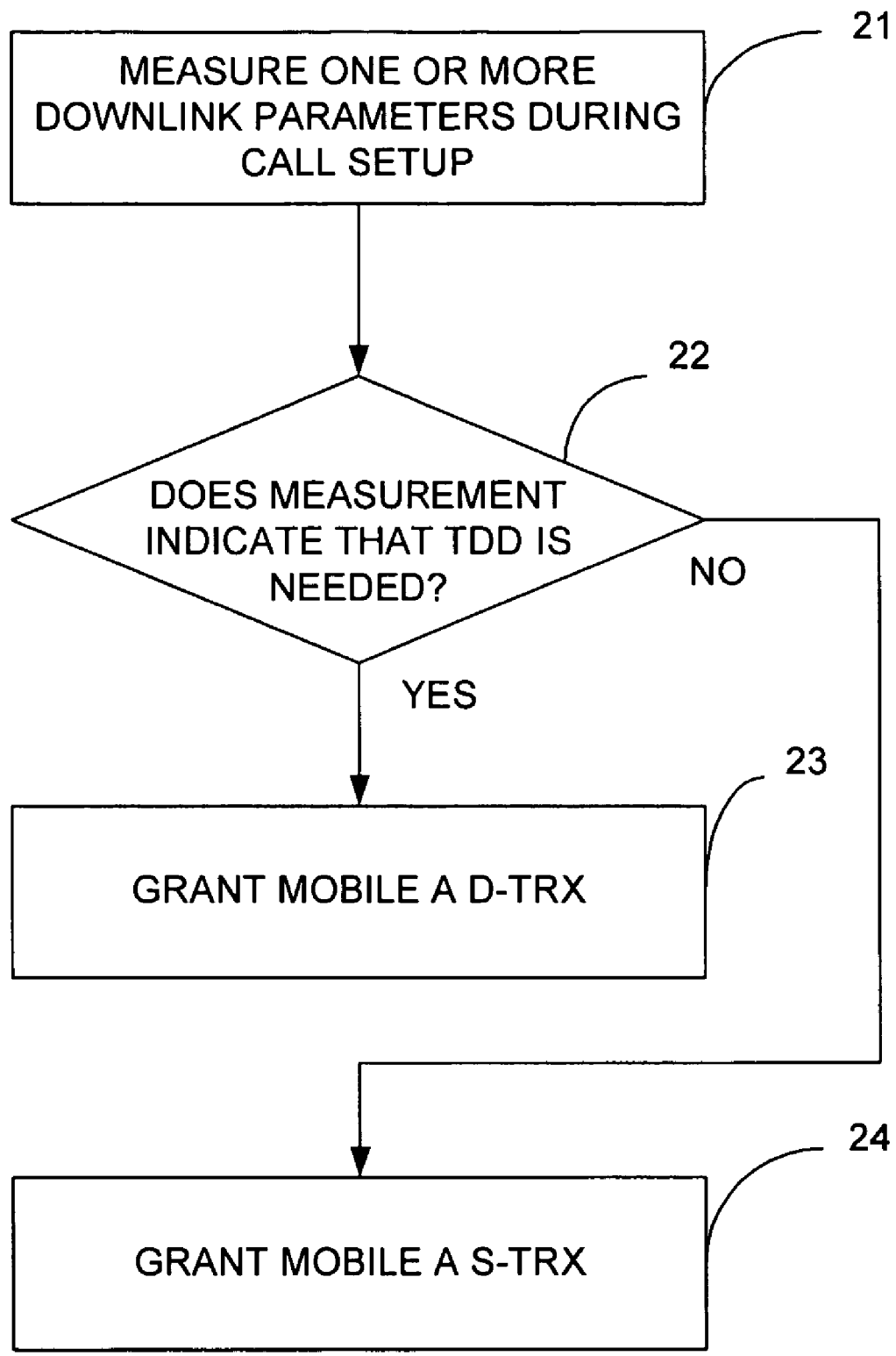
FIG. 2 illustrates a flow chart that demonstrates the preferred method of the present invention performed during call setup to assign a call to a transceiver that implements TDD or to assign the call to a transceiver that does not implement TDD.

In addition, the present invention efficiently utilizes resources by preferably implementing downlink TDD only when it is needed. FIG. 2 illustrates a flow chart that demonstrates the preferred method of the present invention performed during call setup. During call setup, one or more of various downlink signal parameters are measured, as indicated by block 21. These downlink signal parameters may include, for example, downlink signal strength, downlink bit error rate (BER), downlink frame error rate (FER), downlink RXQUAL (i.e., quantized BER levels) and/or downlink carrier-to-interference ratio.

Currently, during call setup, the mobile device is assigned a shared dedicated control channel (SACCH). The mobile device monitors parameters such as, for example, downlink signal strength, downlink BER and downlink FER during call setup and reports the corresponding measurements to the BTS on the SACCH. In accordance with the preferred embodiment, the BTS uses the information reported by the mobile device to determine whether to grant the mobile device a S-TRX or a D-TRX that implements downlink TDD.

To accomplish this, one or more of the reported measurements are compared to a threshold value. For example, the downlink signal strength reported by the mobile device may be compared with a downlink signal strength threshold value. If the reported signal strength measurement is below the threshold value, the mobile device is granted a D-TRX so that downlink TDD can be implemented. If the reported signal strength is above the threshold value, the mobile device is granted a S-TRX that does not implement downlink TDD.

The measurements that are evaluated and the associated threshold values will depend on the type of measurement that is being used. For example, the threshold value that is compared with a measured BER will typically be different from the threshold value that is compared with a measured FER or with a signal strength measurement.

Block 22 represents any one or more of a variety of comparisons that may be made to determine whether downlink TDD needs to be implemented. If the comparison that is made at block 22 indicates that downlink TDD needs to be implemented, the mobile device is granted a D-TRX, as indicated by block 23. If the comparison that is made at block 22 indicates that downlink TDD is not needed, the mobile device is granted a S-TRX, as indicated by block 24.

Figure 3:
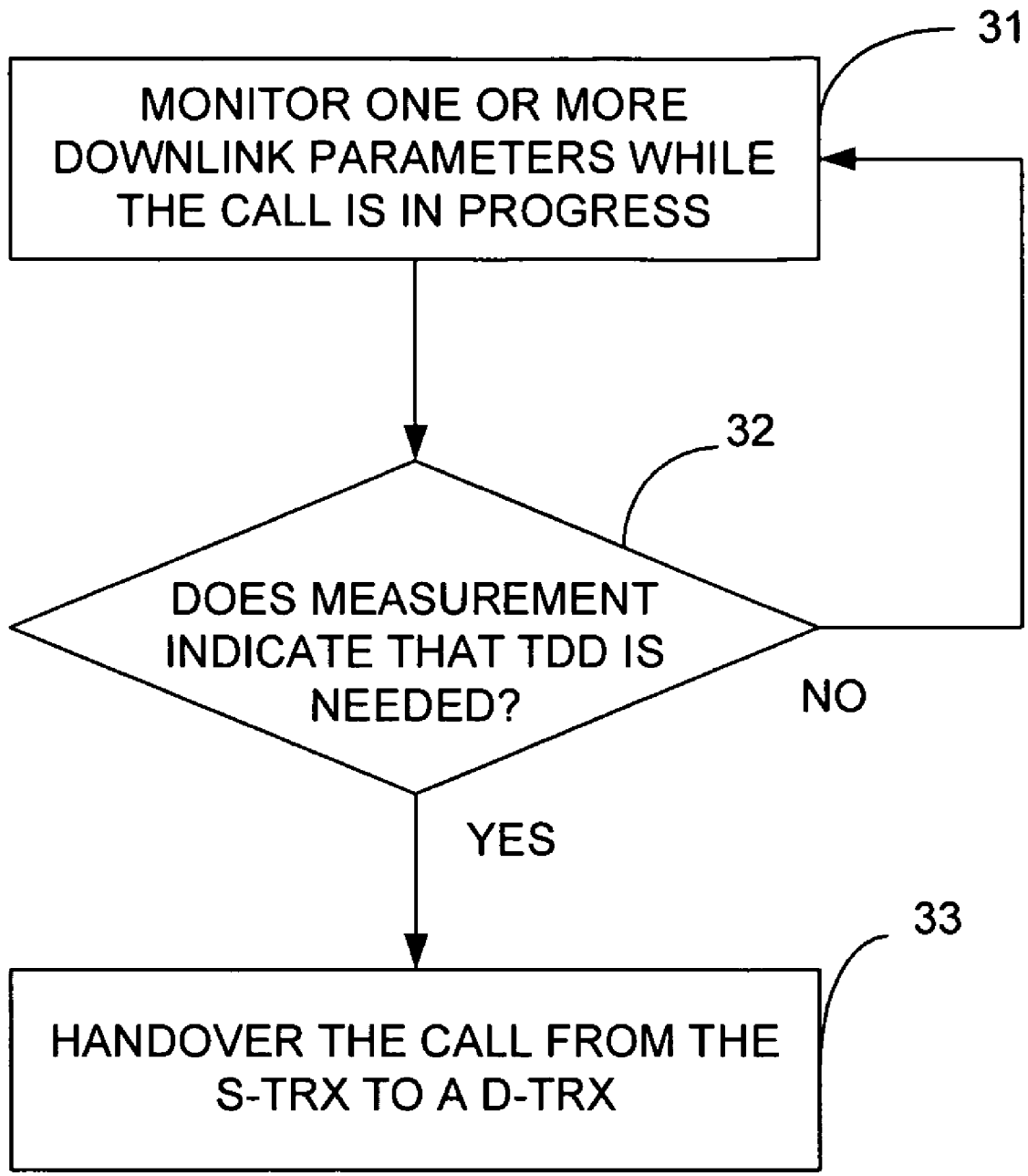
FIG. 3 illustrates a flow chart of the method of the invention for performing an intracell handover from a transceiver that does not implement TDD to a transceiver that does implement TDD when a determination is made that downlink TDD is needed.

FIG. 3 illustrates a flow chart of the method of the invention for performing an intracell handover from a S-TRX to a D-TRX when a determination is made that downlink TDD is needed. The phrase "intracell handover", as that phrase is used herein, is intended to denote a handover from a S-TRX of a BTS to a D-TRX of the same BTS or a handover from a D-TRX of a BTS to a D-TRX of the same BTS.

During a call, preferably one or more of downlink signal strength, BER, FER, RXQUAL and carrier-to-interference ratio are periodically monitored, as indicated by block 31. The capability to monitor all of these parameters and to report measurement information to the BTS already exists. For example, it is known to measure one or more of these parameters and to perform a handover in the same coverage area from a half rate transceiver to a full rate transceiver, or from a frequency hopping transceiver to a non-frequency hopping transceiver.

Based on the measurement information, a determination is made by the BTS as to whether downlink TDD is needed for the call, as indicated by block 32. If so, the call is handed over from the S-TRX handling the call to an available D-TRX, as indicated by block 33. If downlink TDD is not needed, the call continues to be handled by the S-TRX and the parameters continue to be periodically monitored, as indicated by the arrow from block 32 to block 31. If a D-TRX is needed and later becomes available, or if a subsequent determination is made that TDD is needed, the call will be handed over from the S-TRX to the available D-TRX.

Figure 4:
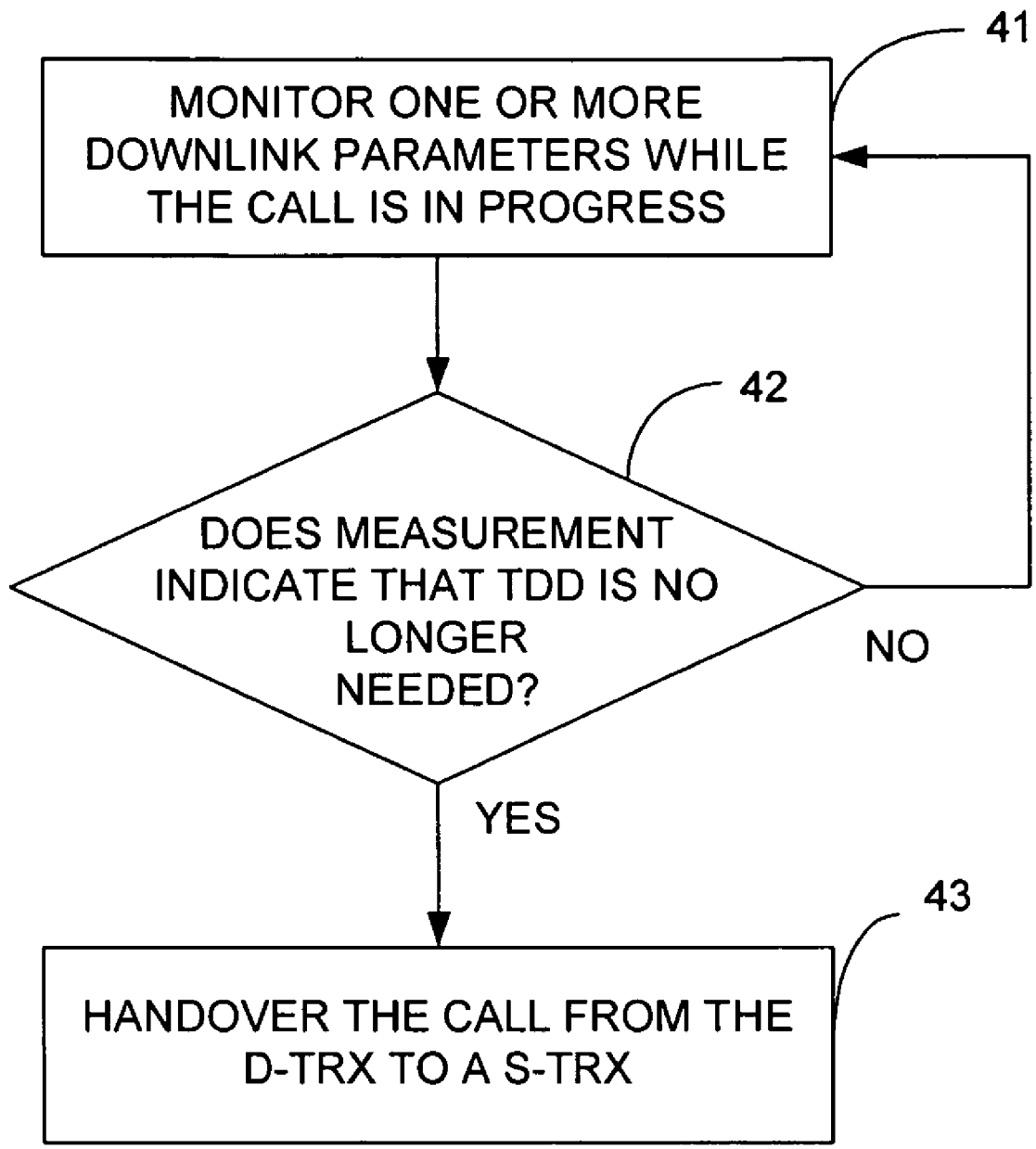
FIG. 4 illustrates a flow chart of the method of the invention for performing an intracell handover from a transceiver that does implement TDD to a transceiver that does not implement TDD when a determination is made that downlink TDD is no longer needed for the call.

FIG. 4 illustrates a flow chart of the method of the invention for performing an intracell handover from a D-TRX to a S-TRX when a call is being handled by a D-TRX and a determination is made that downlink TDD is no longer needed. As with the embodiment described above with reference to FIG. 3, preferably one or more of downlink signal, BER, FER, RXQUAL and carrier-to-interference ratio are periodically monitored, as indicated by block 41. Based on the measurement information, a determination is made by the BTS as to whether downlink TDD is no longer needed for the call, as indicated by block 42. If a determination is made that downlink TDD is no longer needed, the call is handed over from the D-TRX handling the call to an available S-TRX, as indicated by block 43. If downlink TDD is needed, the call continues to be handled by the D-TRX and the parameters continue to be periodically monitored, as indicated by the arrow from block 42 to block 41.

Figure 5:
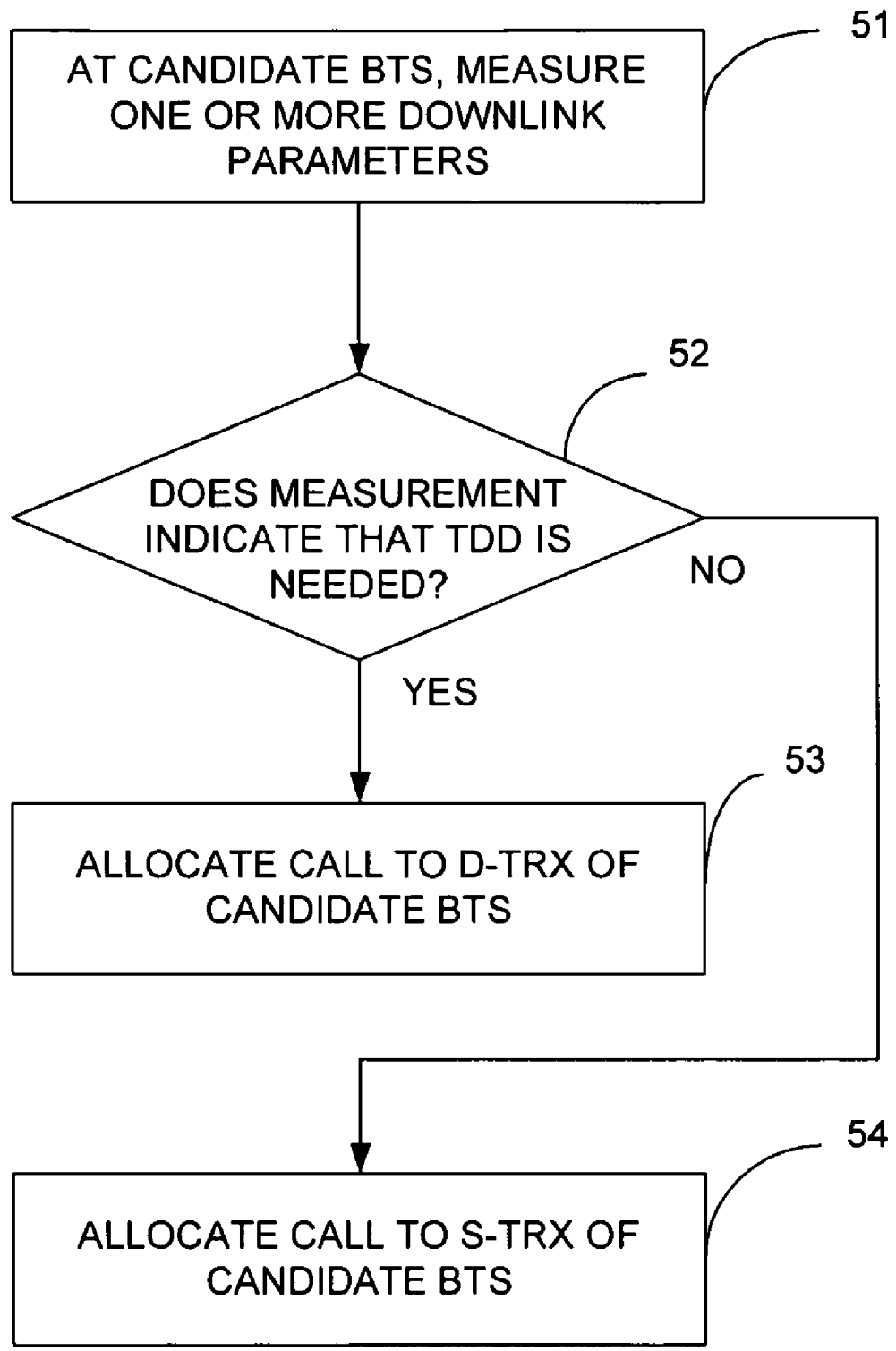
FIG. 5 illustrates a flow chart of the method of the invention for assigning a call to either a transceiver that does not implement TDD to a transceiver that does implement TDD depending on whether TDD is needed when a call is being handed over from one BTS to another.

FIG. 5 illustrates a flow chart of the method of the invention for assigning a call to a S-TRX or to a D-TRX when a call is being handed over from one BTS to another. During call handover from one BTS to another, the candidate BTS (i.e., the BTS to which the call is being handed over) evaluates signal parameters such as, for example, downlink signal strength, downlink BER, downlink FER, downlink RXQUAL and carrier-to-interference ratio, as indicated by block 51. A determination is made by the candidate BTS as to whether downlink TDD is needed, as indicated by block 52. If so, the call is allocated to a D-TRX of the candidate BTS, as indicated by block 53. If not, the call is allocated to a S-TRX of the candidate BTS, as indicated by block 54.

It should be noted that the invention has been described with reference to certain preferred embodiments and that the invention is not limited to these embodiments. For example, although the BTS 1 shown in FIG. 1 is depicted as having multiple D-TRXs 16, a single D-TRX may be sufficient when allocating calls based on the need to use downlink TDD. Also, although the functions described above with reference to FIGS. 2-5 are typically performed by software being executed by a processor of the BTS, they may also be performed by the base station controller (BSC) or by the mobile switching center (MSC), for example. The invention is not limited with respect to the locations at which these functions are performed or with respect to the manner in which these functions are physically implemented. Those skilled in the art will understand the manner in which other modifications may be made to the embodiments describe herein and that all such modifications are within the scope of the invention.

What is claimed is:

1. An apparatus for allocating resources during call setup based on whether or not downlink transmit delay diversity (TDD) is needed for the call being setup, the apparatus comprising:

first logic configured to evaluate one or more downlink parameters associated with a call;

second logic configured to determine whether or not TDD is needed for the call based on the evaluation by the first logic;

third logic configured to allocate a duplex transceiver to the call if the second logic makes a determination that downlink TDD is needed, the duplex transceiver being configured to implement downlink TDD, and comprising at least two simplex transceivers, each simplex transceiver being connected to a respective antenna, said at least two simplex transceivers communicating with a single mobile device during a single time slot;

fourth logic configured to allocate a simplex transceiver to the call if the second logic determines that downlink TDD is not needed for the call, the simplex transceiver not being configured to implement downlink TDD; and fifth logic configured to evaluate the downlink parameters while the call is in progress and initiate a handover from the simplex transceiver to the duplex transceiver if the logic determines that downlink TDD is needed or initiate a handover from the duplex transceiver to the simplex transceiver if the logic determines that downlink TDD is no longer needed.

2. The apparatus of claim 1, wherein the downlink parameters are evaluated while the call is being setup.

3. The apparatus of claim 1, wherein the first logic evaluates one or more downlink parameters associated with the call as the call is being handed over from a first BTS to a second BTS, the apparatus further comprising:

sixth logic configured to initiate a handover from a transceiver of the first BTS to a transceiver of the second BTS if the second logic determines that downlink TDD is needed.

4. The apparatus of claim 3, wherein the transceiver of the second BTS is configured to implement downlink TDD.

5. The apparatus of claim 3, wherein the transceiver of the second BTS is not configured to implement downlink TDD.

6. A method for allocating resources during call setup based on whether downlink transmit delay diversity (TDD) is needed for the call, the method comprising:

evaluating one or more downlink parameters associated with a call;

determining whether or not downlink TDD is needed for the call based on the evaluation;

allocating a first transceiver to the call if a determination that downlink TDD is needed, the first transceiver being configured to implement downlink TDD;

allocating a second transceiver to the call if a determination is made that downlink TDD is not needed for the call, the second transceiver not being configured to implement downlink TDD;

reallocating the first transceiver to the call during the call if the second transceiver is allocated and a determination is made that downlink TDD is needed; and reallocating the second transceiver to the call during the call if the first transceiver is allocated and a determination is made that downlink TDD is no longer needed;

wherein the downlink parameters are evaluated as the call is being handed over from the first transceiver to the second transceiver, the first transceiver being a duplex transceiver, the second transceiver being a simplex transceiver, the duplex transceiver comprising at least two simplex transceivers, each simplex transceiver of the duplex transceiver being connected to a respective antenna, said at least two simplex transceivers communicating with a single mobile device during a single time slot.

7. The method of claim 6, wherein the downlink parameters are evaluated during an intracell handover while the call is being handed over from the first transceiver to the second transceiver, the first transceiver being in a first coverage area of the wireless network and the second transceiver being in the same coverage area of the wireless network.

8. The method of claim 6, wherein the downlink parameters are evaluated during a handover of the call from the first transceiver to the second transceiver, the first transceiver being part of a first base transceiver station (BTS), the second transceiver being part of a second BTS.

* * * * *